United States Patent
Baumann

(10) Patent No.: US 8,044,550 B2
(45) Date of Patent: Oct. 25, 2011

(54) ROEBEL BAR FOR ROTATING ELECTRICAL MACHINES

(75) Inventor: Thomas Baumann, Wettingen (CH)

(73) Assignee: Alstom Technology Ltd, Baden (CH)

( * ) Notice: Subject to any disclaimer, the term of this patent is extended or adjusted under 35 U.S.C. 154(b) by 147 days.

(21) Appl. No.: 12/568,979

(22) Filed: Sep. 29, 2009

(65) Prior Publication Data

US 2010/0079027 A1    Apr. 1, 2010

(30) Foreign Application Priority Data

Sep. 29, 2008   (CH) ........................... 1539/08

(51) Int. Cl.
*H02K 3/40* (2006.01)
(52) U.S. Cl. ................... 310/196; 174/DIG. 13
(58) Field of Classification Search ............. 310/196; 174/DIG. 13–DIG. 31; *H02K 3/40*
See application file for complete search history.

(56) References Cited

U.S. PATENT DOCUMENTS

| | | | | |
|---|---|---|---|---|
| 1,784,997 A | * | 12/1930 | Schenkel | 174/70 R |
| 2,959,699 A | * | 11/1960 | Smith et al. | 310/260 |
| 3,679,925 A | * | 7/1972 | Fort | 310/196 |
| 3,975,653 A | | 8/1976 | Kawakami et al. | |
| 4,361,723 A | * | 11/1982 | Hvizd et al. | 174/102 SC |
| 5,106,462 A | * | 4/1992 | Kawakami et al. | 205/164 |
| 5,777,417 A | | 7/1998 | Haldemann | |
| 6,498,415 B1 | * | 12/2002 | Emery | 310/196 |
| 2007/0292674 A1 | * | 12/2007 | Morin | 428/292.1 |

FOREIGN PATENT DOCUMENTS

| | | |
|---|---|---|
| EP | 0778648 A1 | 6/1997 |
| JP | 57095144 A | 6/1982 |
| JP | 58157350 A | 9/1983 |

OTHER PUBLICATIONS

Adhesion's Definition, http://dictionary.reference.com/.*
Translation of JP 58-157350.*
J. Thienpont et al. "Suppression des decharges superficielles dans les bobinages statoriques des machines tournantes haute tension" [Suppression of surface discharges in the stator winding of high voltage machines], Conference Internationale des grands reseaux electriques a haute tension, Paris, 1964 (concise statement in specification on p. 2).

* cited by examiner

*Primary Examiner* — Quyen Leung
*Assistant Examiner* — Thomas Truong
(74) *Attorney, Agent, or Firm* — Leydig, Voit & Mayer, Ltd.

(57) ABSTRACT

A Roebel bar for a rotating electrical machine includes a straight slot part disposed in a slot in an iron sheet of a stator of the rotating electrical machine and a bent yoke part adjacent to the straight slot part and protruding from the stator, wherein the bent yoke part is configured to connect the Roebel bar to at least one more Roebel bar so as to form a winding. A copper conductor disposed in the straight slot part and the bent yoke part is surrounded by an insulation having an outer surface. A slot corona shielding includes an electrically conductive layer disposed on the outer surface of the insulation in an area of the straight slot part. A yoke corona shielding includes a semiconducting layer disposed on the outer surface of the insulation in an area of the bent yoke part.

10 Claims, 2 Drawing Sheets

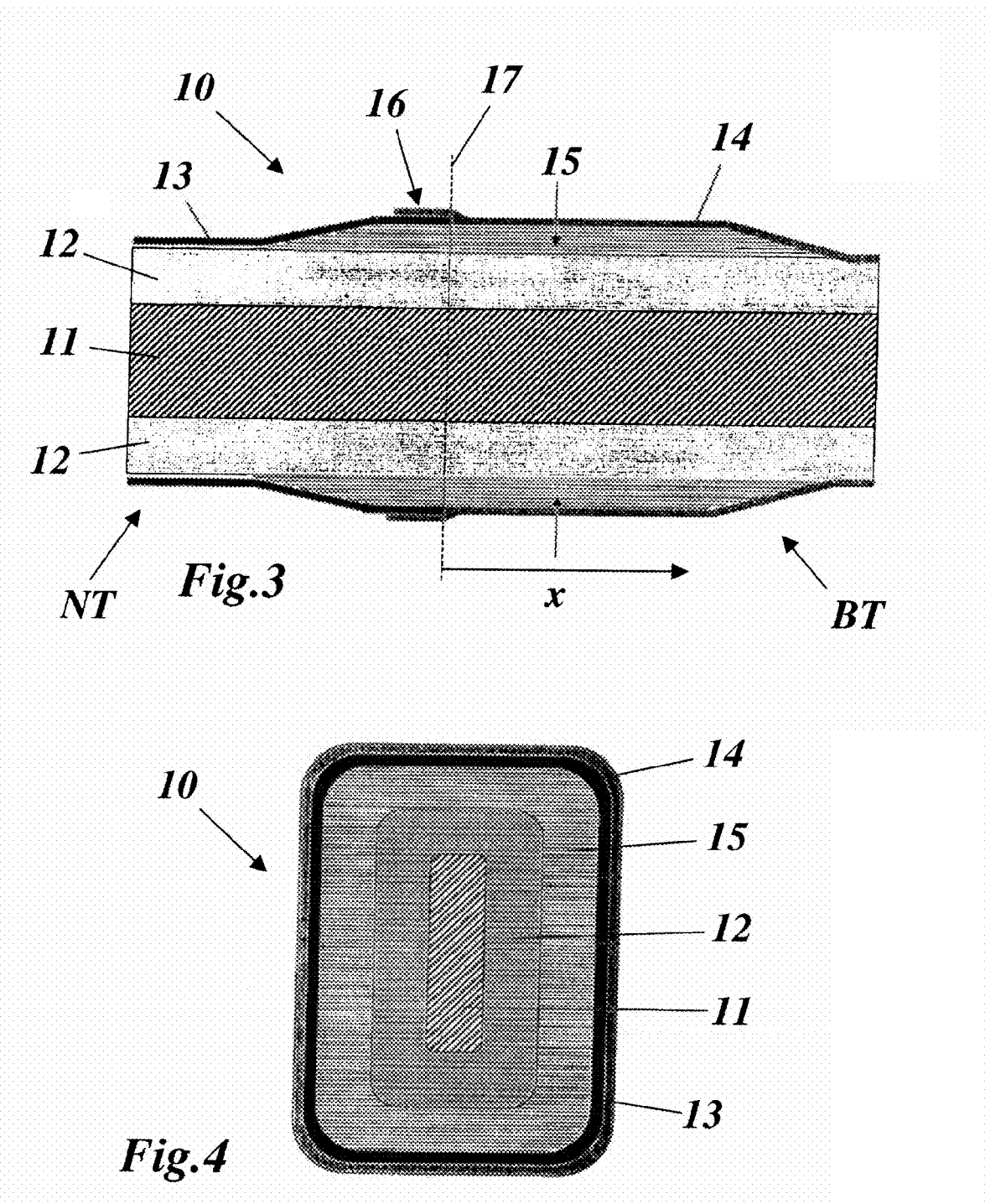

ROEBEL BAR FOR ROTATING ELECTRICAL MACHINES

Priority is claimed to Swiss Application No. 01539/08, filed on Sep. 29, 2008, the entire disclosure of which is incorporated by reference herein.

The present invention relates to the field of electrical machines. It concerns a Roebel bar.

BACKGROUND

Bars referred to as Roebel bars, as known for example from the document EP-A1-0 778 648, are used as electrical conductors of the stator winding of rotating electrical machines, in particular turbogenerators. In the case of such a Roebel bar, a distinction is made between the straight slot part, which is in direct contact with the iron sheet of the stator, and the bent yoke part, which protrudes from the stator and by means of which each bar is connected to other bars to form a winding (see FIG. 1 of the aforementioned document). Roebel bars are provided with an insulation, in order to avoid a short-circuit with the iron sheet of the stator (slot part) or with other Roebel bars (yoke part).

As corona shielding, the surface of this insulation is usually provided with a conductive layer (sheet conductivity approximately 1000 ohms.cm/cm) in the (straight) slot part and with a semiconductive layer, which preferably has a field-dependent conductivity (sheet conductivity $10^7$-$10^{12}$ ohms.cm/cm), in the (bent) yoke part. Correspondingly, the two corona shielding layers are referred to as slot corona shielding (SCS) and yoke corona shielding (YCS).

Probably the most critical point of the SCS/YCS corona shielding system is the transition between SCS and YCS. As a result of the low resistance of the SCS, the shielding is at ground potential up to its end. In the case of high-impedance YCS, on the other hand, the capacitor coupling via the insulation gains in significance. This has the effect that, with increasing distance from the SCS end, the surface potential of the Roebel bar assumes the potential of the electrical conductor ($U_L$). Therefore, equalizing currents flow on the surface, and these currents are particularly high in the region of the SCS/YCS transition.

This can be easily explained for the case where $R(YCS)=\infty$. In this case, the surface potential $U(x)$ at the point x on the yoke is given by the ratio of surface capacitance ($C_o$) to capacitance of the insulation ($C_{iso}$). It is:

$$U(x)=U_L*f(C_o, C_{iso})=U_L*C_{iso}/(C_o+C_{iso});$$

where x denotes the distance from the end of the SCS, which is at x=0. $C_o$ is proportional to $1/x$, while $C_{iso}$ is proportional to $\epsilon/d$ (d=insulation thickness), as in the case of a conventional plate capacitor. FIGS. 1 and 2 show the variation of $U(x)/U_L$ in arbitrary units of x, where the ratio of $C_o(x=1)/C_{iso}=0.1$ ("normal coupling", curve b) or 0.2 ("strong coupling", curve a) is chosen. The two figures differ by different scaling of the x axis.

In the case of the field-dependent resistance of the YCS, the situation is similar, but more complicated to describe (see in this respect J. Thienpont, T. H. Sie "Suppression of surface discharges in the stator winding of high voltage machines" in "Conference Internationale des grands réseaux électriques à haute tension", Paris, 1964).

The electric field $E=dU/dx$ is the strongest at x=0. However, this also means that there the density of the displacement currents, j, also increases, and consequently also the dielectric heat losses, which are proportional to $E*j$. This is the cause of the increased temperatures at the SCS end. The electric field strength itself is also problematic: it can increase so much that surface discharges occur. On the other hand, although the corona shielding helps, it does not help up to any level of voltage and capacitor coupling. Temperature increases and discharges may occur in particular under the following conditions:

When testing with $U_{test}$ above $2U_n$ for $U_n$ above 20 kV.

When testing with insulations with increased dielectric coupling (i.e. higher $C_{iso}$). Such insulation is concerned if, for example, an insulation with $E_n \geq 3.5$ kV/mm is to be achieved (the standard is $E_n$=2.5 kV/mm-3.0 kV/mm). For $U_n$=.const., increasing $E_n$ means a reduction in the insulating thickness by 25%-40% and a corresponding increase in $C_{iso}$. In addition to this there is also an increase in $\epsilon$ of about 50%, since the proportion of the mica with $\epsilon$=9 is higher than in the standard insulation.

SUMMARY OF THE INVENTION

An aspect of the present invention provides a Roebel bar with which excessive heating and the occurrence of discharges in the region of the SCS/YCS transition are reliably prevented.

In order to prevent excessive heating and discharges in the transitional region between the slot part and the yoke part, means for lowering the capacitive coupling are provided in this region.

According to an embodiment of the invention, the means for lowering the capacitive coupling in the transitional region between the slot part and the yoke part comprise a local thickening of the insulation in the transitional region. In particular, the local thickening of the insulation is achieved by an additional insulation applied over the insulation. The additional insulation may differ from the insulation with regard to the materials used, for example it may be of a lower insulating quality.

Another refinement of the invention is characterized in that the insulation includes resin-impregnated glass/mica strips, and in that the additional insulation is built up from resin-impregnated glass strips and/or glass wovens and/or glass nonwovens.

Still more favorable results are achieved if the insulation includes resin-impregnated glass/mica strips, and the additional insulation is built up from resin-impregnated strips and/or wovens and/or nonwovens of polymeric fibers.

It is advantageous in this respect if a resin with an especially low dielectric constant, in particular a cyanate ester, is used for impregnating the strips and/or wovens and/or nonwovens.

However, it is also conceivable for the additional insulation to consist of less polar polymers with a relative dielectric constant of 2-4, in particular from the series PTFE, PP, Kapton®, Mylar® and Nylon®.

In particular, in such a case the material of the additional insulation may be applied by shrink-fitting, spraying, immersion, adhesion, vulcanizing or pouring.

BRIEF DESCRIPTION OF THE DRAWINGS

The invention is to be explained in more detail below on the basis of exemplary embodiments in conjunction with the drawings, in which

FIG. 3 shows the longitudinal section through the SCS/YCS transitional region of a Roebel bar according to an exemplary embodiment of the invention; and FIG. 4 shows the cross section through the Roebel bar from FIG. 3 at the boundary between SCS and YCS.

DETAILED DESCRIPTION

Figure 1:
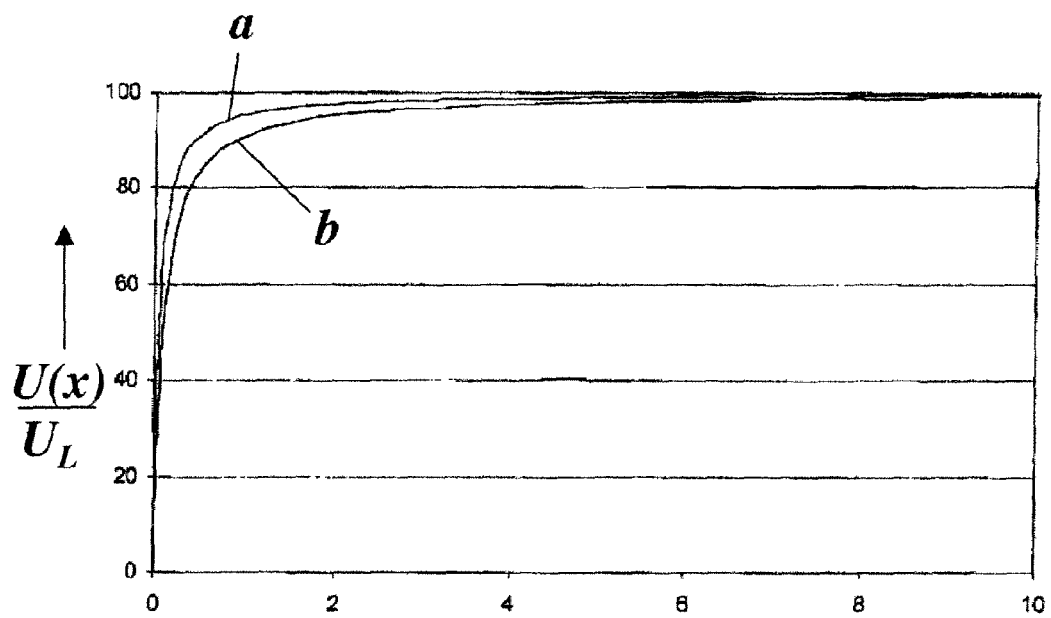
FIG. 1 shows the ratio of surface potential to conductor potential in the yoke part of a Roebel bar in dependence on the distance x from the boundary between slot corona shielding (SCS) and yoke corona shielding (YCS) for the case of infinite resistance of the YCS and with "normal" or "strong" coupling.
Figure 2:
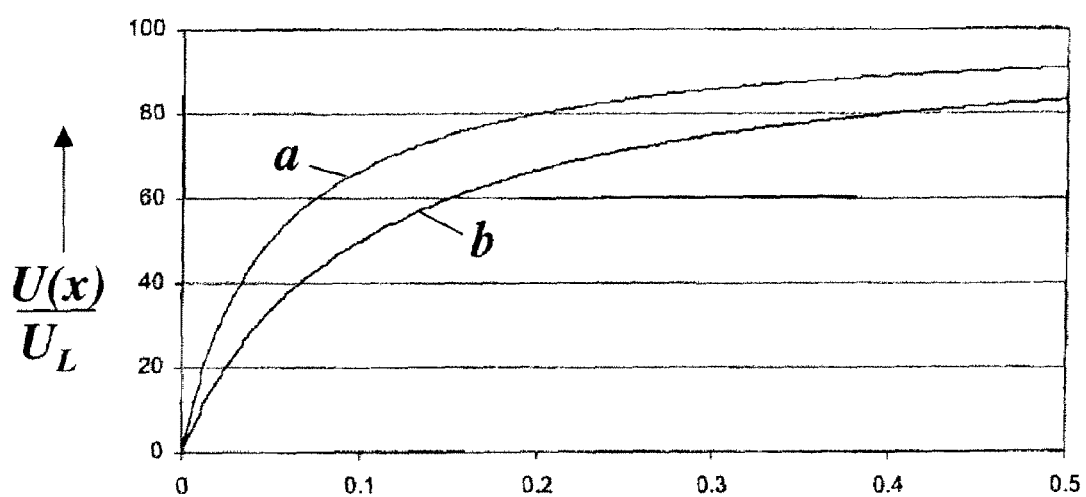
FIG. 2 shows the initial part of the curves from FIG. 1 with the x axis extended.

FIGS. 3 and 4 show the longitudinal section and the transverse section through the Roebel bar 10 according to an exemplary embodiment of the invention in the transitional region between the (straight) slot part NT and the (bent) yoke part BT. The Roebel bar 10 of the exemplary embodiment comprises a central Cu conductor 11 with an approximately rectangular cross section, which is surrounded by an insulation 12, which consists for example of wound, resin-impregnated glass/mica strips. In the slot part NT, the surface of the insulation 12 is covered with a conducting layer as slot corona shielding 13. In the yoke part BT, the surface of the insulation 12 is covered with a semiconducting layer as yoke corona shielding 14. In the transitional region, the yoke corona shielding 14 overlaps the slot corona shielding 13 and forms a region of overlap 16.

Beneath and to both sides of the region of overlap 16 or the boundary 17 between SCS and YCS, an additional insulation 15 is arranged so as to protrude into the slot part NT and the yoke part BT, surrounding the insulation 12 on the outside and tapering in thickness toward the edges.

Use of the additional insulation 15 is a preferred measure to achieve lowering of the capacitive coupling in the YCS/SCS region.

The additional insulation 15 locally forms a thickening of the insulation 12 in the YCS/SCS transitional region. This thickening may either be implemented in the process for producing the Roebel bar, or take place subsequently. The quality of this additional insulation 15 need not necessarily be of the same grade as the insulation in the slot part NT, since of course the latter insulation is itself already capable of ensuring sufficient protection from disruptive breakdown.

Therefore, the additional insulation 15 or the thickening preferably does not consist of resin-impregnated glass/mica strips, but of resin-impregnated glass strips, wovens or nonwovens, with quartz glass being used instead of E-glass as the base material thereof. Quartz glass has a permittivity of $\epsilon=3.9$, which is significantly less than the permittivity of E-glass ($\epsilon=6.2$) or mica ($\epsilon=7\text{-}10$). As a result, the total permeability $\epsilon_{tot}$ of the mica insulation+glass insulation system is lowered.

As an alternative to quartz glass, advantageous lowering of $\epsilon_{tot}$ can be achieved if the strips/wovens/nonwovens used consist of polymeric fibers, for example of PET, PEN, aramid or polyamide. These materials have a permittivity of $\epsilon=3\text{-}4$.

An even lower $\epsilon_{tot}$ is obtained if a resin with an especially low $\epsilon$, for example cyanate ester with $\epsilon=3$, is used instead of the conventional epoxy or polyester resins for impregnating the strip/wovens/nonwovens of the additional insulation 15.

Further lowering can be achieved if, instead of consisting of wound and impregnated strips/wovens/nonwovens, the additional insulation 15 consists entirely or mostly of less polar polymers with $\epsilon=2\text{-}4$, for example PTFE, PP ($\epsilon=2\text{-}2.2$), Kapton®, Mylar® or Nylon® ($\epsilon=$about 3). The choice of plastics is not restricted to these examples. Instead of being applied by winding and impregnating, such materials may also be partly applied by other methods, such as shrink-fitting, spraying, immersion, adhesion, vulcanizing, pouring, etc., in order to create the additional insulation 15.

An example of the improvement thereby achieved is to be given below:

Let the capacitance of the original insulation be given by $\epsilon_{iso}=6$, $d_{iso}=4$ mm; the capacitance of the additional layer would have the corresponding values $\epsilon_{zu}=3$, $d_{zu}=4$ mm.

It then follows that:

$$C_{iso}\sim 6/4=3/2 \; C_{zu}\sim 3/4 \; 1/C_{tot}\sim 2/3+4/3=2 \Rightarrow C_{tot}\sim 1/2.$$

This means that there is a reduction in the capacitive coupling by a factor of 3.

LIST OF DESIGNATIONS

10 Roebel bar
11 Cu conductor
12 insulation
13 slot corona shielding
14 yoke corona shielding
15 additional insulation
16 region of overlap
17 NT/BT boundary
U(x) surface potential
$U_L$ conductor potential
$C_o$ surface capacitance
$C_{iso}$ insulation capacitance
NT slot part
BT yoke part

What is claimed is:

1. A Roebel bar for a rotating electrical machine comprising:
    a straight slot part disposed in a slot in an iron sheet of a stator of the rotating electrical machine;
    a bent yoke part adjacent to the straight slot part and protruding from the stator, wherein the bent yoke part is configured to connect the Roebel bar to at least one more Roebel bar so as to form a winding;
    a copper conductor disposed in the straight slot part and the bent yoke part;
    a first insulation surrounding the copper conductor and having an outer surface;
    a slot corona shielding including an electrically conductive layer disposed on the outer surface of the first insulation in an area of the straight slot part;
    a yoke corona shielding including a semiconducting layer disposed on the outer surface of the first insulation in an area of the bent yoke part; and
    an element configured to lower a capacitive coupling disposed in a transitional region between the straight slot part and the bent yoke part so as to prevent excessive heating and discharges in the transitional region, the element including an additional second insulation disposed directly on the first insulation and extending along the transitional region.

2. The Roebel bar as recited in claim 1, wherein a material of the first insulation differs from a material of the additional second insulation.

3. The Roebel bar as recited in claim 2, wherein the materials of the first and second insulation each have a different insulating quality.

4. The Roebel bar as recited in claim 2, wherein the first insulation includes resin-impregnated glass/mica strips, and wherein the additional second insulation includes at least one of resin-impregnated strips, wovens and nonwovens comprised of quartz glass.

5. The Roebel bar as recited in claim 2, wherein the first insulation includes resin-impregnated glass/mica strips, and wherein additional second insulation includes at least one of resin-impregnated strips, wovens and nonwovens comprised of polymeric fibers.

6. The Roebel bar as recited in claim 4, wherein the resin-impregnated strips, wovens and nonwovens include a resin with a low dielectric constant.

7. The Roebel bar as recited in claim 5, wherein the resin-impregnated strips, wovens and nonwovens include a resin with a low dielectric constant.

8. The Roebel bar as recited in claim 2, wherein the additional insulation includes polymers having a relative dielectric constant of between 2 and 4.

9. The Roebel, bar as recited in claim 8, wherein the polymers are selected from the group consisting of: PTFE and PP.

10. The Roebel bar as recited in claim 8, wherein the additional insulation is applied by one of shrink-fitting, spraying, immersion, adhesion, vulcanizing and pouring.

\* \* \* \* \*